United States Patent
Deleeuw (12)

(10) Patent No.: US 6,173,315 B1
(45) Date of Patent: *Jan. 9, 2001

(54) USING SHARED DATA TO AUTOMATICALLY COMMUNICATE CONFERENCE STATUS INFORMATION WITHIN A COMPUTER CONFERENCE

(75) Inventor: William C. Deleeuw, Hillsboro, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/623,973

(22) Filed: Mar. 29, 1996

(51) Int. Cl.$^7$ ..................................................... G06F 15/16
(52) U.S. Cl. ............................................ 709/205; 345/332
(58) Field of Search ................................... 709/204, 205; 345/329, 330, 331, 332

(56) References Cited

U.S. PATENT DOCUMENTS

| | | | |
|---|---|---|---|
| 4,974,173 | * 11/1990 | Stefik et al. | 345/331 |
| 5,382,972 | * 1/1995 | Kannes | 348/15 |
| 5,392,400 | * 2/1995 | Berkowitz et al. | 395/200.01 |
| 5,442,788 | * 8/1995 | Bier | 395/344 |
| 5,491,743 | * 2/1996 | Shiio et al. | 379/202 |
| 5,515,493 | * 5/1996 | Boston et al. | 345/344 |
| 5,533,183 | * 7/1996 | Henderson, Jr. et al. | 345/344 |
| 5,537,548 | * 7/1996 | Fin et al. | 395/682 |
| 5,557,725 | * 9/1996 | Ansberry et al. | 395/331 |
| 5,561,755 | * 10/1996 | Bradley | 345/340 |
| 5,596,714 | * 1/1997 | Connell | 395/183.14 |
| 5,608,872 | * 3/1997 | Schwartz et al. | 395/200.04 |
| 5,673,404 | * 9/1997 | Cousins et al. | 345/347 |
| 5,684,802 | * 11/1997 | Perreault et al. | 370/448 |
| 5,694,544 | * 12/1997 | Tanigawa et al. | 345/332 |

OTHER PUBLICATIONS

Matt Pietrek, "Windows Internals: The Implementation Of The Windows Operating Environment", Jul. 1994, Chapter 3, pp. 213–298.

"Microsoft Windows 3.1 Programmer's Reference", vol. 2—Functions. No Date Avail.

Sunil et al. (Computer–based real–time conferencing systems) Computer/IEEE pp. 33–45, Oct. 1985.*

* cited by examiner

*Primary Examiner*—Meng-Ai T. An
*Assistant Examiner*—Gautam R. Patel
(74) *Attorney, Agent, or Firm*—Blakely, Sokoloff, Taylor & Zafman LLP (57) ABSTRACT

A method and apparatus communicates conference information from a host computer system to one or more guest computer systems. The host computer system includes a host application sharing engine (HASE). The HASE posts a unique message to a message queue of a shared application program. The HASE monitors the message queue for retrieval of the unique message. Upon detecting the retrieval of the unique message from the message queue by the shared application program, the HASE communicates the conference information to the one or more guest computer systems.

27 Claims, 9 Drawing Sheets

FIG. 10

USING SHARED DATA TO AUTOMATICALLY COMMUNICATE CONFERENCE STATUS INFORMATION WITHIN A COMPUTER CONFERENCE

FIELD OF THE INVENTION

The present invention relates to the field of application program sharing between computer systems. More particularly, this invention relates to communicating conference notifications to all participants within a computer conferencing session.

BACKGROUND OF THE INVENTION

A set of personal computers interconnected on a network can be effectively used as a data conferencing system. In such a system, each conference participant typically comprises a personal computer user having a computer, a screen display, a computer network interface and typically a mouse or cursor control device. Conference participants are linked together by a computer network. This network may comprise either a hardwired local area network (LAN) such as Ethernet, a telephone modem link or other conventional data communications network. Because the conference participants are linked via a computer network, the participants do not need to be located in the same physical space. Rather, an effective conference may be carried out as participants view common information on their local screen displays and manipulate information using their local cursor control devices or other input devices. The conference participants can concurrently communicate with each other via phone lines.

Several problems are present in these prior art conferencing systems. In a typical conferencing application, a group of conference participants linked via a network share common information pertaining to a particular meeting or topic under discussion. By sharing information between conference participants, each participant is able to view and manipulate the information dispersed during the meeting.

At times it is desirable for certain messages to be displayed to all participants of the conference. For example, a conference notification that a new participant has joined the conference is desirable. One prior art way of displaying a notification message is for each computer system to independently display its own dialog box, or dialog, to its screen display. Subsequently some users may use their input devices, such as a mouse, to acknowledge and remove the dialog. This may result in each participant viewing a different screen display from that of the other participants, and this may cause confusion among the participants.

Figure 1:
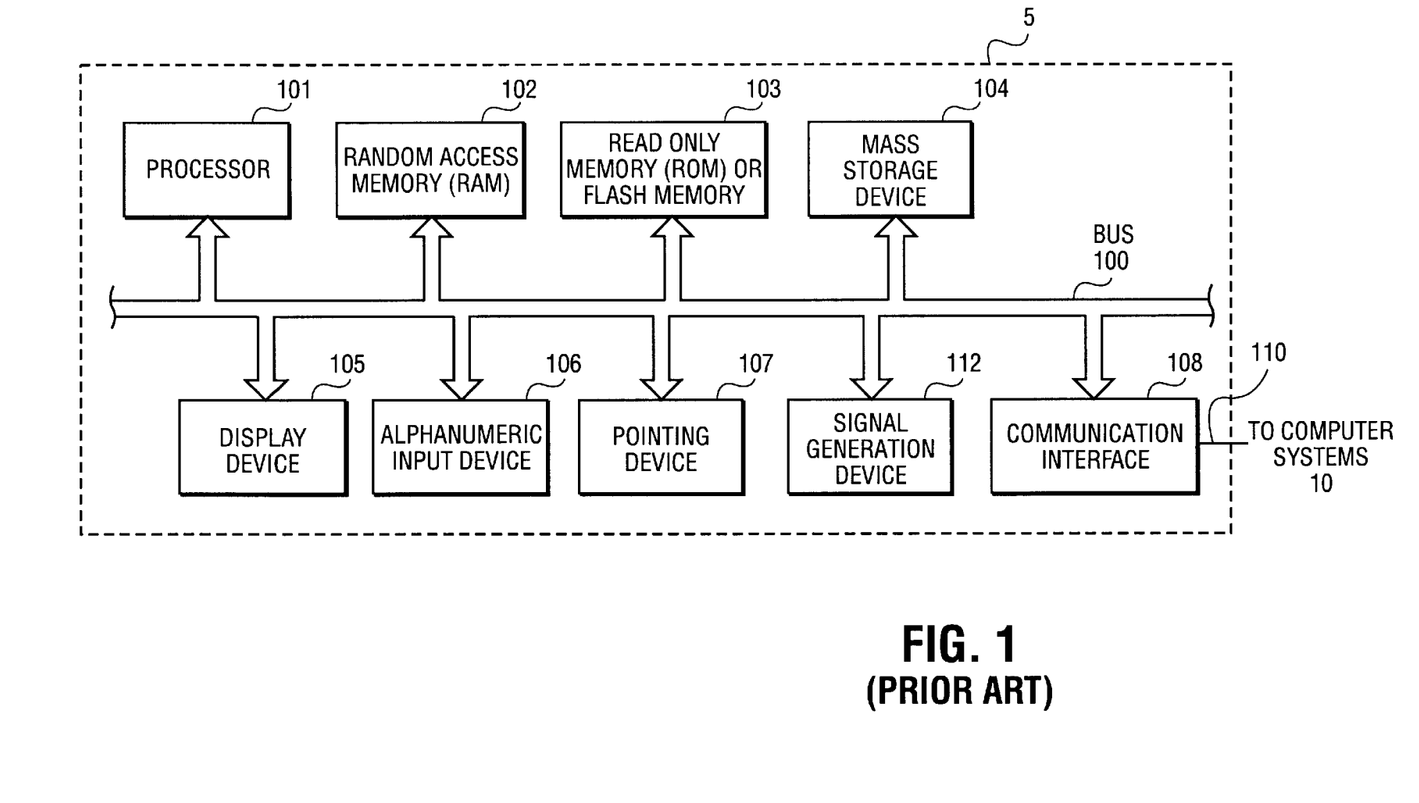
FIG. 1 is a block diagram of the computer system hardware used in a computer system of the computer conference.

FIG. 1 is a block diagram of the computer system hardware used in a computer system of the computer conference. The computer system 5 comprises a Bus 100 for communicating information between computer system components. These components coupled to Bus 100 include Processor 101, which can be, for example, an i486™ or Pentium® brand microprocessor manufactured by Intel Corporation, Santa Clara, Calif. The i486 and Pentium marks are trademarks of Intel Corporation. Other system components include Random Access Memory (RAM) 102, Read Only Memory (ROM) 103, and mass storage device or disk drive 104. The computer system 5 also includes display device 105 coupled to the Bus 100 for displaying information to a computer user, an alphanumeric input device 106 coupled to the Bus 100 for communicating information and command selections to the Processor 101, a pointing device or cursor control device 107 coupled to the Bus 100 for communicating information and command selections to Processor 101, and a signal generation device 112 coupled to the Bus 100 for communicating command selections to the Processor 101. Display device 105 may be a liquid crystal device, cathode ray tube, or other suitable display device. Alphanumeric input device 106 is typically an alphanumeric or function key keyboard. Pointing device or cursor control device 107 is typically a mouse or trackball device allowing the computer user to dynamically signal the two dimensional movement of a visible symbol (i.e. cursor) on the screen display of display device 105. Many implementations of the cursor control device 107 are well known in the art, including trackball, mouse, joystick, or special keys on the alphanumeric input device 106 capable of signaling movement in a given direction. Signal generation device 112 is typically implemented as a button or switch located on or near the cursor control device 107.

The computer system 5 also includes a communication interface 108. Communication interface 108 is coupled to communication medium 110. Communication interface 108 provides a means for the computer system to communicate with a network of other computer systems. A variety of ways to network computers are well known in the art. These communication media 110 include well known Local Area Networks (LAN) such as Ethernet, Wide Area Networks (WAN), telephone modem links, or other well known and conventional computer networking technologies. The configuration and interconnection of computer system components as illustrated in FIG. 1 is well known to those of ordinary skill in the art.

Computer system 5 is networked to one or more other computer systems 10 via the communication media 110. The other computer systems 10 include hardware similar to that of computer system 5.

In one configuration of a computer conference system, the computer system 5 is a host computer system and the other computer systems 10 are guest computer systems. The host computer system selects certain application programs for sharing with the guest computer systems. The data resides on the host computer system and graphics information corresponding to the data is communicated to the guest computer systems. In another conferencing configuration, shared data may reside on all computer systems.

Figure 2:
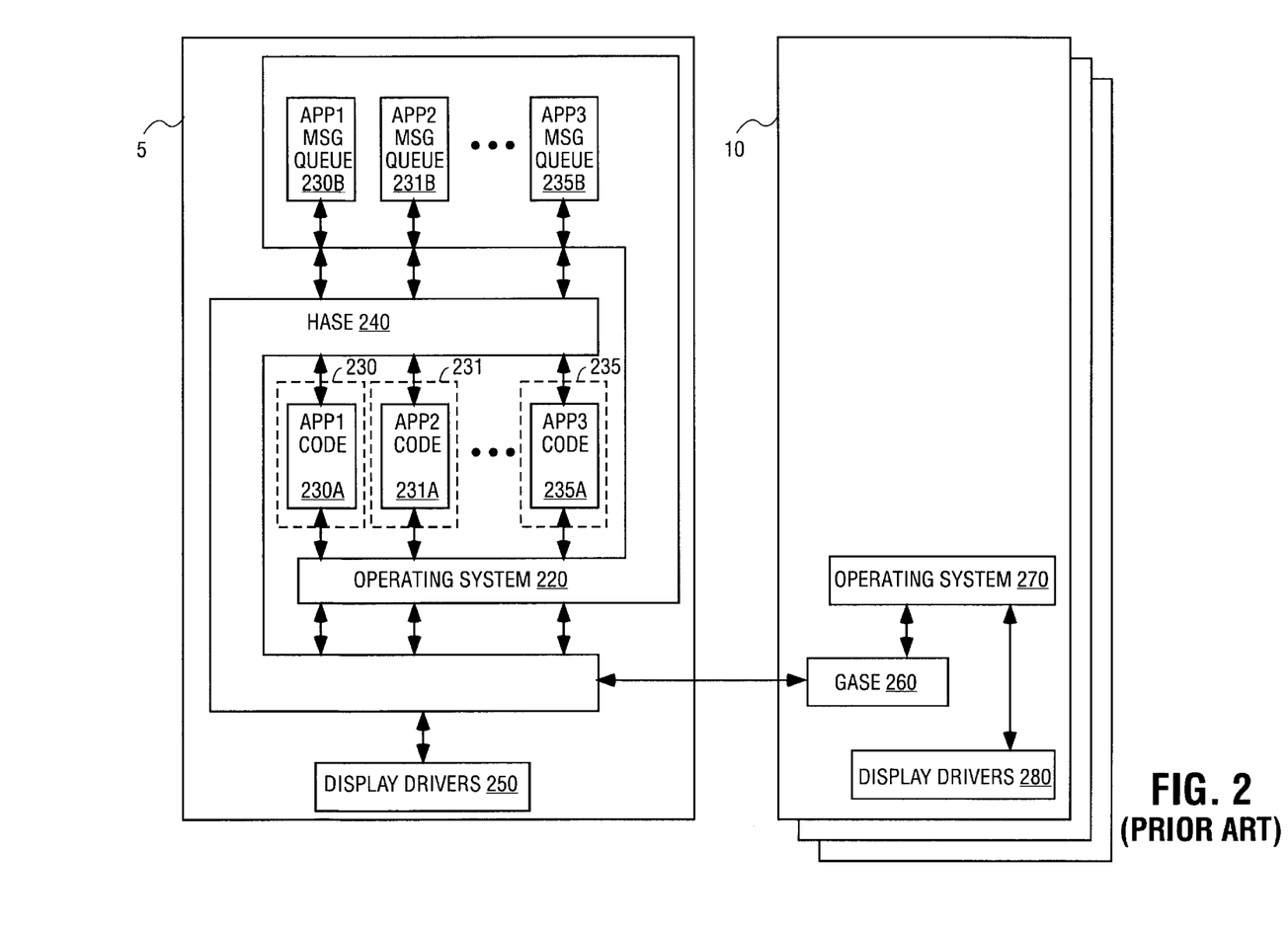
FIG. 2 is a representation of the interaction of the software and operation systems of the host computer system and the guest computer systems.

FIG. 2 is a representation of the interaction of the software and operation systems of the host computer system 5 and the guest computer systems 10. In one conferencing configuration, the host computer system 5 includes a message-driven operating system 220, such as one of the Windows™ operating systems developed by Microsoft Corporation of Redmond, Wash. Windows is a trademark of Microsoft, Inc. In this conferencing configuration, the operating system is multitasking such that one task may run for a while, then another task may run for a while, and so on. Each task, or application program, will have an associated context, which may include register information, along with privilege information, segmentation, and/or paging information, as is well-known. Information about tasks and their context can be found in various texts, for example, "Windows™ Internals," by Matt Pietrek, published by Addison-Wesley Publishing Co. (1993), in particular, Chapter 3: Modules and Tasks.

The host computer system 5 includes one or more application programs 230–235, which include application code 230a–235a. Application code 230a is associated with an application message queue 230b, application code 231a is associated with an application message queue 231b, and so forth. In one conferencing configuration, application message queues 230b–235b are part of the operating system 220.

Application codes 230a–235a and the application message queues 230b–235b are interactively coupled together. Each time one of the application codes 230a–235a is ready for processing a new message, it requests from the operating system the next message of its associated message queue. The operating system in turn accesses the appropriate application message queue and provides the next message in the appropriate message queue to the corresponding application code.

The host computer system includes a host application sharing engine (HASE) 240, which is an application program. The HASE 240 is coupled to the operating system 220 and display drivers 250.

Each of the guest computer systems 10 include a guest application sharing engine (GASE) 260, an operating system 270, and display drivers 280. The GASE 260 is interactively coupled to the operating system 270, and the operating system 270 is interactively coupled to the display drivers 280. The guest computer systems may also include application programs similar to those of the host computer 5.

The HASE 240 of the host computer system 5 is coupled to the GASEs 260 of the guest computer systems 10 via the communication interfaces 108 of the computer systems and the communications media 110.

In one conferencing configuration, the host computer system 5 selects certain of its application programs for sharing with the guest computer systems 10. The HASE 240 intercepts any updates of these shared application programs to the display drivers 250 and communicates these updates to the GASEs 260 of the guest computer systems 10. The GASEs 260 communicate this information to their display drivers 280 via the guest operating systems 260 such that the guest computer systems 10 all update their display screens. The GASEs 260 also communicate to the HASE 240 any interactions made by the guest systems' user inputs to the shared data. For example, if one of the guest systems add data to or change data in one of the shared application programs, then the GASE communicates the input from the guest system to the HASE so that all display screens of the computer conference can be updated appropriately.

Figure 3:
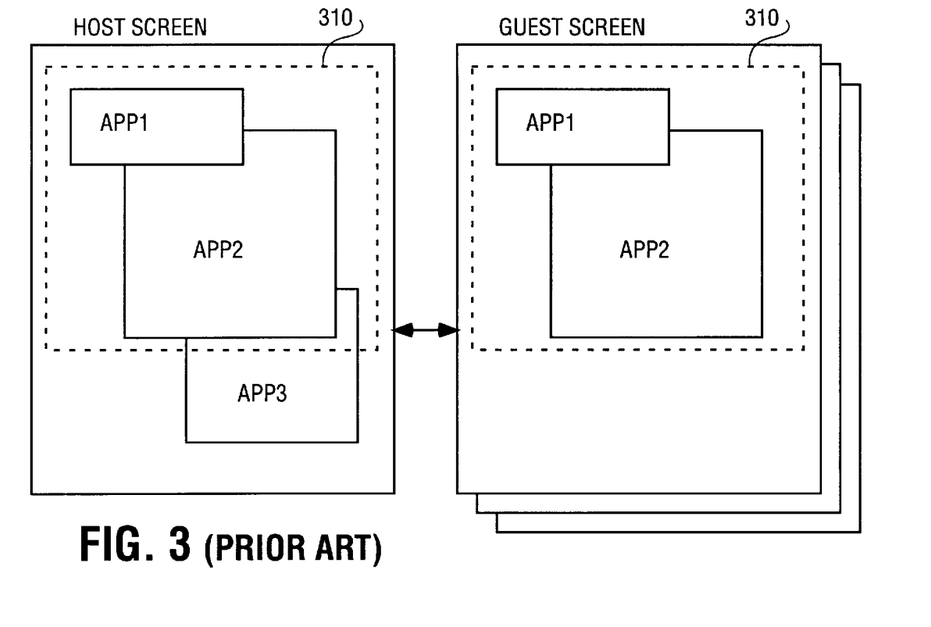
FIG. 3 is an example of a display screen of a host computer system and the corresponding display screens of the guest computer systems.

FIG. 3 is an example of a display screen of a host computer system 5 and the corresponding display screens of the guest computers systems 10. FIG. 3 includes three application windows associated with three different applications running on the host computer system. Application 1 (APP1) and application 2 (APP2) are shared applications. Application 3 (APP3) is an unshared application. Thus, only the data from APP1 and APP2 are shared to the guest computer systems.

The display data of the shared applications APP1 and APP2 is displayed to the display screens of the guest computer systems 10. The data of the unshared application APP3 is not displayed to the guest computer screens. In one computer conferencing configuration, a bounding box 300 is associated with the bounds of the shared data of the shared applications. The information within the bounding box 300 is communicated from the host computer system 5 to the guest computer systems 10.

Figure 4:
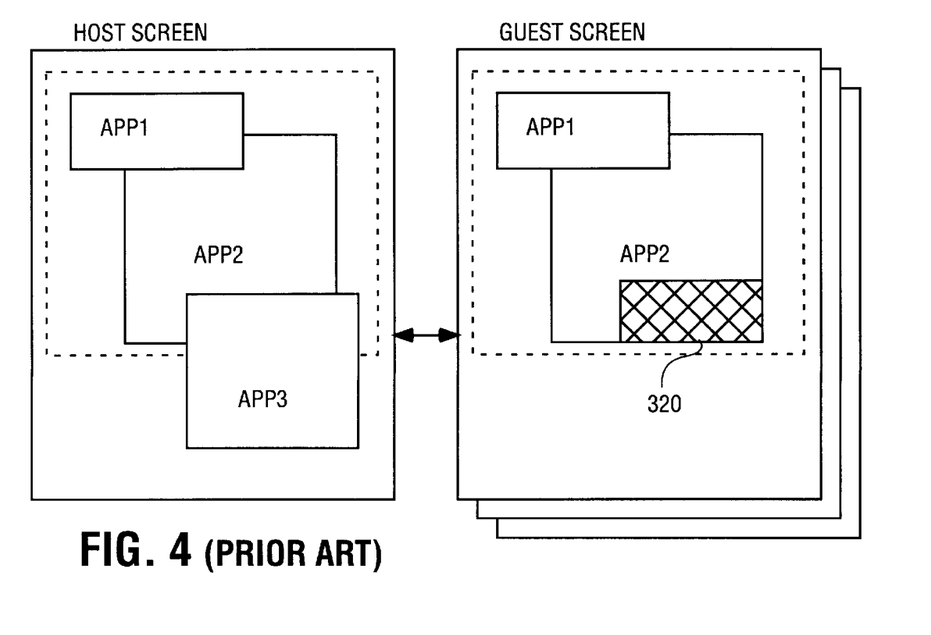
FIG. 4 is an example of a display screen of the host computer system and the display screens of the guest computer systems when a window associated with an unshared application (APP3) overlays the window of a shared application (APP2).

FIG. 4 is an example of a display screen of the host computer system 5 and the display screens of the guest computer systems 10 when the window associated with an unshared application (APP3) overlays the window of a shared application (APP2).

Since the data from APP3 is unshared, the host computer system does not share the data from APP3 with the guest computer systems. However, since APP3 is obscuring a portion of APP2, in one conferencing configuration, this obscuring is displayed on the guest computer systems as a hatched area 320.

SUMMARY AND OBJECTS OF THE PRESENT INVENTION

An object of this invention is to provide an improved method of displaying conference notification messages to the participants of a computer conference.

Another object of the invention is to provide a method of creating a conference notification message within the context of a shared application.

A method and apparatus for communicating information from a host computer system to one or more guest computer systems networked together in a computer conference are described. A host computer system includes a host application sharing engine (HASE). The HASE posts a unique message to a message queue of a shared application program. The HASE monitors the message queue for retrieval of the unique message. Upon detecting the retrieval of the unique message from the message queue by the shared application program, the HASE communicates the conference information to the one or more guest computer systems.

Other objects, features, and advantages of the present invention will be apparent from the accompanying drawings and from the detailed description that follows below.

DETAILED DESCRIPTION

An apparatus and method for communicating information to a plurality of computer systems networked together in a computer conference are described. FIGS. 1–4 were used to describe how a host application sharing engine shares data from the host computer system to one or more guest computer systems.

Figure 5:
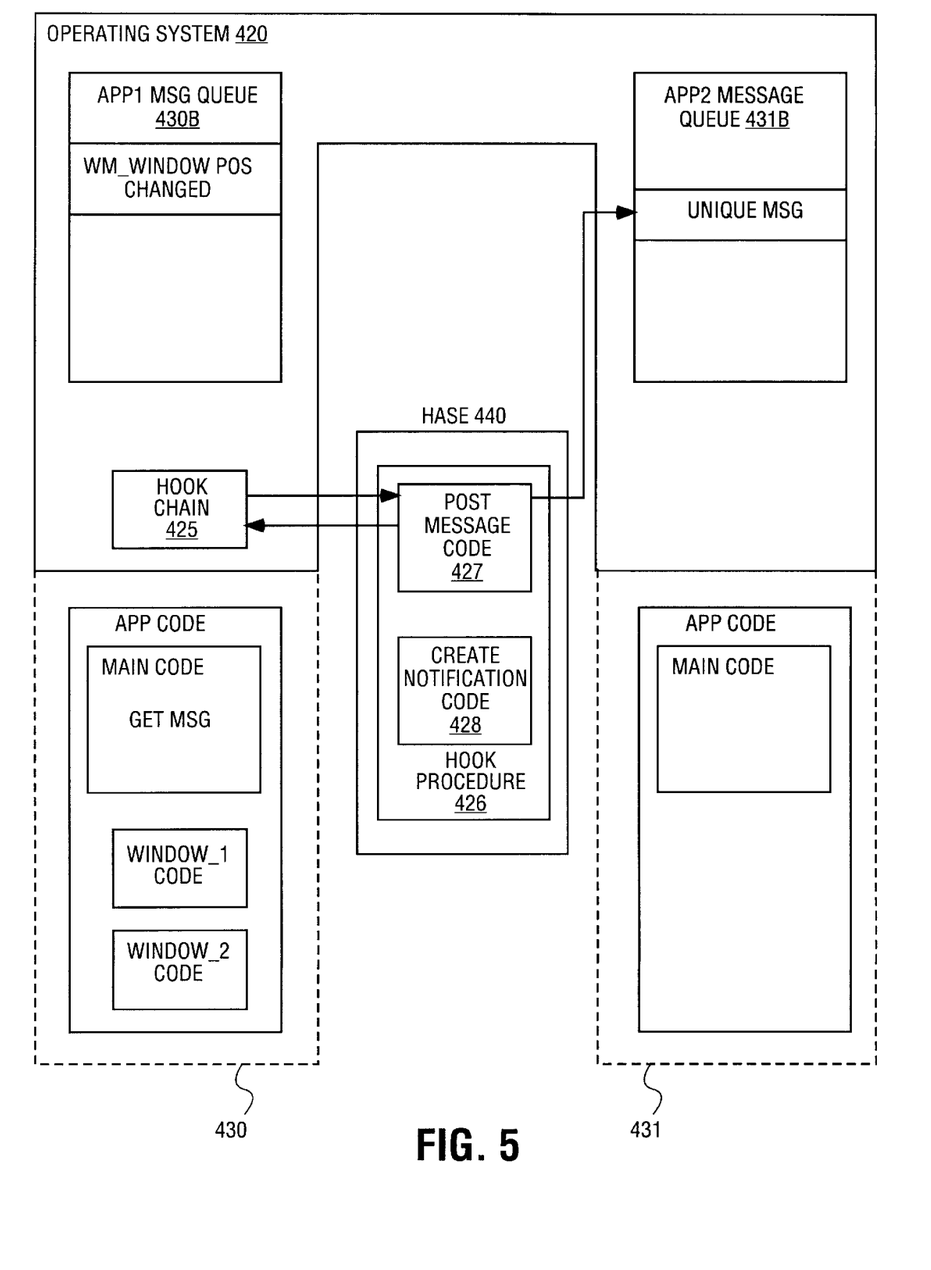
FIG. 5 is a representation showing the interactions between two shared applications (APP1 and APP2), the host application sharing engine (HASE), and the operating system when a notification-triggering event occurs.

FIG. 5 is a representation showing the interactions between two shared applications (APP1 430 and APP2 431), the host application sharing engine (HASE) 440, and the operating system 420 when a notification-triggering event occurs.

The operating system 420 includes a hook chain mechanism 425 that allows application programs to register as hooked procedures, as is well known in the prior art. For example, the "Microsoft® Windows™ 3.1 Programmer's Reference: Volume 2," published by Microsoft Press (1992) describes functions such as the SetWindowsHookEx function that are used to hook procedures. Once an application program has registered as a hooked procedure, then whenever the operating system detects certain events, the operating system transfers control to the registered, or hooked, procedure, i.e., the application program. For one embodiment, an application program can register as a hooked procedure such that any time that a message is retrieved by any other application program, then the hooked procedure will be executed.

FIG. 5 shows the HASE 440 including a hooked procedure 426. The hooked procedure includes post message code 427 and create notification code 428. The hooked procedure 426 was previously registered with the hook chain mechanism 425 of the operating system 420.

FIG. 5 shows APP1 executing an instruction 'GET MSG' from its main code. The operating system 420 retrieves the next message from the APP1's message queue 430b. Because the HASE 440 previously registered as a hooked procedure with the operating system 420, the operating system transfers control through the hook chain mechanism 425 so that the HASE is able to access the message retrieved from the APP1 message queue.

If the HASE, through the post message code 427, determines that a certain event has occurred which should be communicated to all participants of the conference, then it will search for one of the shared applications. In this case, it finds shared application APP2. The HASE posts a unique message to the message queue of APP2. The HASE then returns control to the hook chain mechanism 425 of the operating system 420, which delivers the message from the APP1 message queue to the APP1 code so that the APP1 code can perform any procedures with the APP1 message.

Some of the events which could be used to trigger a notification to the participants of the conference include:

1) contention between the user inputs (e.g., mouse or keyboard inputs) from two or more users;
2) a shared window is being obscured by an unshared window;
3) a new participant has joined the conference;
4) a participant has left the conference;
5) a new application is being shared in the conference; and
6) an application is no longer being shared in the conference.

Figure 6:
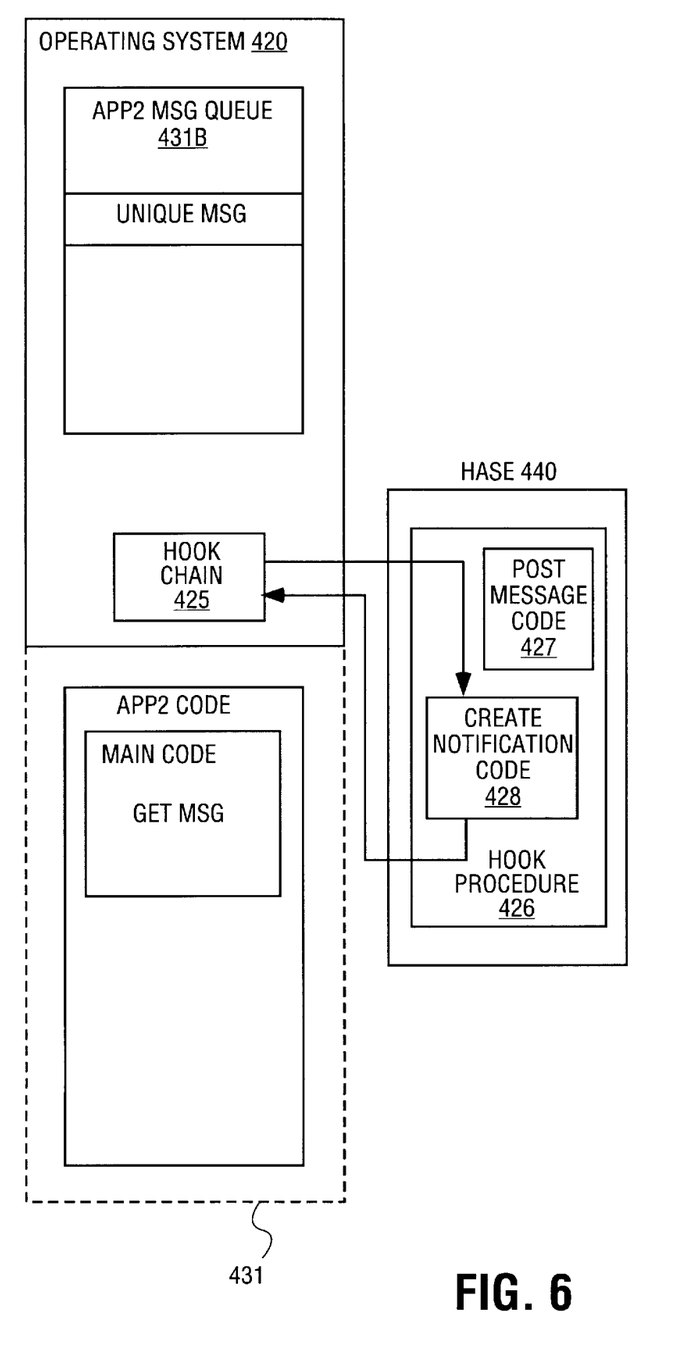
FIG. 6 shows the interactions between APP2, the HASE, and the operating system when the unique message of FIG. 5 is retrieved.

FIG. 6 shows the interactions between APP2 431, the HASE 440, and the operating system 420 when the unique message of FIG. 5 is retrieved from the APP2 message queue 431b.

When the operating system subsequently gives control to APP2 to run, the APP2 code requests from the operating system the next message from APP2's associated message queue. In this case, the next message is the unique message which was posted as described in FIG. 5. The operating system 420 transfers control to the hooked procedure 426 of the HASE via the hook chain mechanism 425. The create notification code 428 within the HASE detects the unique message. The create notification code 428 creates a notification message and displays the notification message to the display screen of the host computer system. The operating system treats the notification message as being within the context of the shared application APP2. The HASE subsequently returns control to APP2 via the operating system 420.

For one embodiment, the notification message takes the form of a dialog box, or dialog. The dialog is communicated to the display drivers of the host computer system 5. The graphics information for the dialog is also communicated by the HASE to the GASEs. The GASEs communicate the graphics information to their respective display drivers via their respective operating systems, as was previously described. The dialog remains until it is acknowledged by one of the conference participants providing a user input via a mouse device, for example.

For another embodiment, the notification message is displayed to the display screen in its own window, similar to a dialog; however, the notification message does not need an acknowledgment. The notification message disappears after a predetermined amount of time or after a triggering event occurs, e.g., after the problem that caused the notification message goes away. For another embodiment, the notification message is scrolled across the screen.

Although there are many ways to display the notification message to the display screens of the host and guest computer systems, for simplicity the following description will be described in terms of a shared dialog, i.e., a dialog that was created within the context of a shared application program. Other embodiments of displaying the notification messages may be performed similarly.

The shared dialog is displayed to all of the computer systems of the conference in the same manner that shared data is normally displayed to the computer systems of the computer conference. All of the computer systems are thus interactive with the shared dialog. Any of the computer systems can acknowledge the shared dialog, for example, by clicking on a box within the shared dialog.

For one embodiment, the shared dialog code of the HASE freezes the windows of all shared applications prior to displaying the shared dialog to ensure that no other shared applications will overlay the shared dialog. The windows of the shared applications are unfrozen after the shared dialog has been acknowledged.

Figure 7:
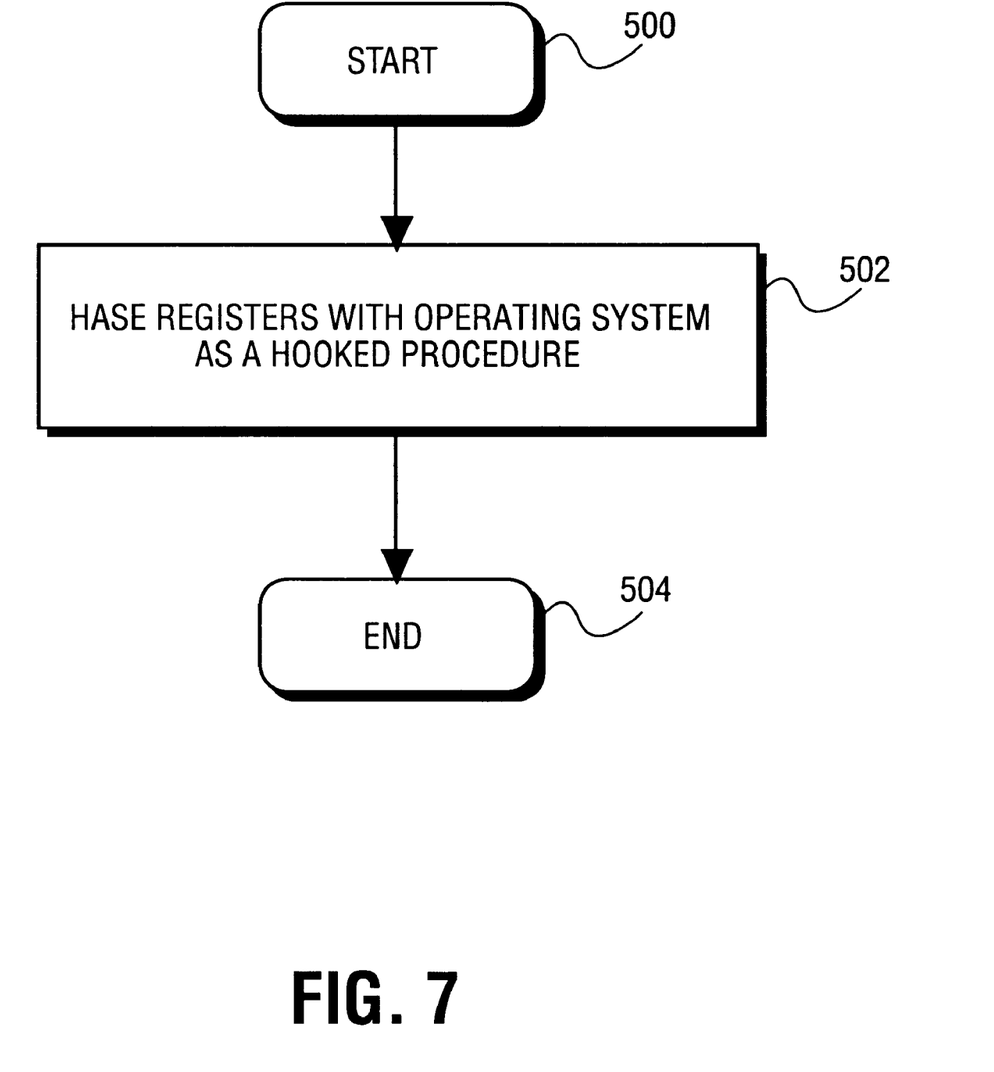
FIG. 7 shows a flowchart of the initialization steps taken by the HASE to create a shared dialog.

FIG. 7 shows a flowchart of the initialization steps taken by the HASE to create a shared dialog. The flowchart starts at a block 500 and continues at block 502. At block 502, the HASE registers as a hook procedure with the operating system. For one embodiment, the HASE registers as a hook procedure for all application programs running on the host computer system, so that whenever any of the application programs request from the operating system the next message of the application program's associated message queue, the HASE will be hooked to receive the message that is retrieved.

Figure 8:
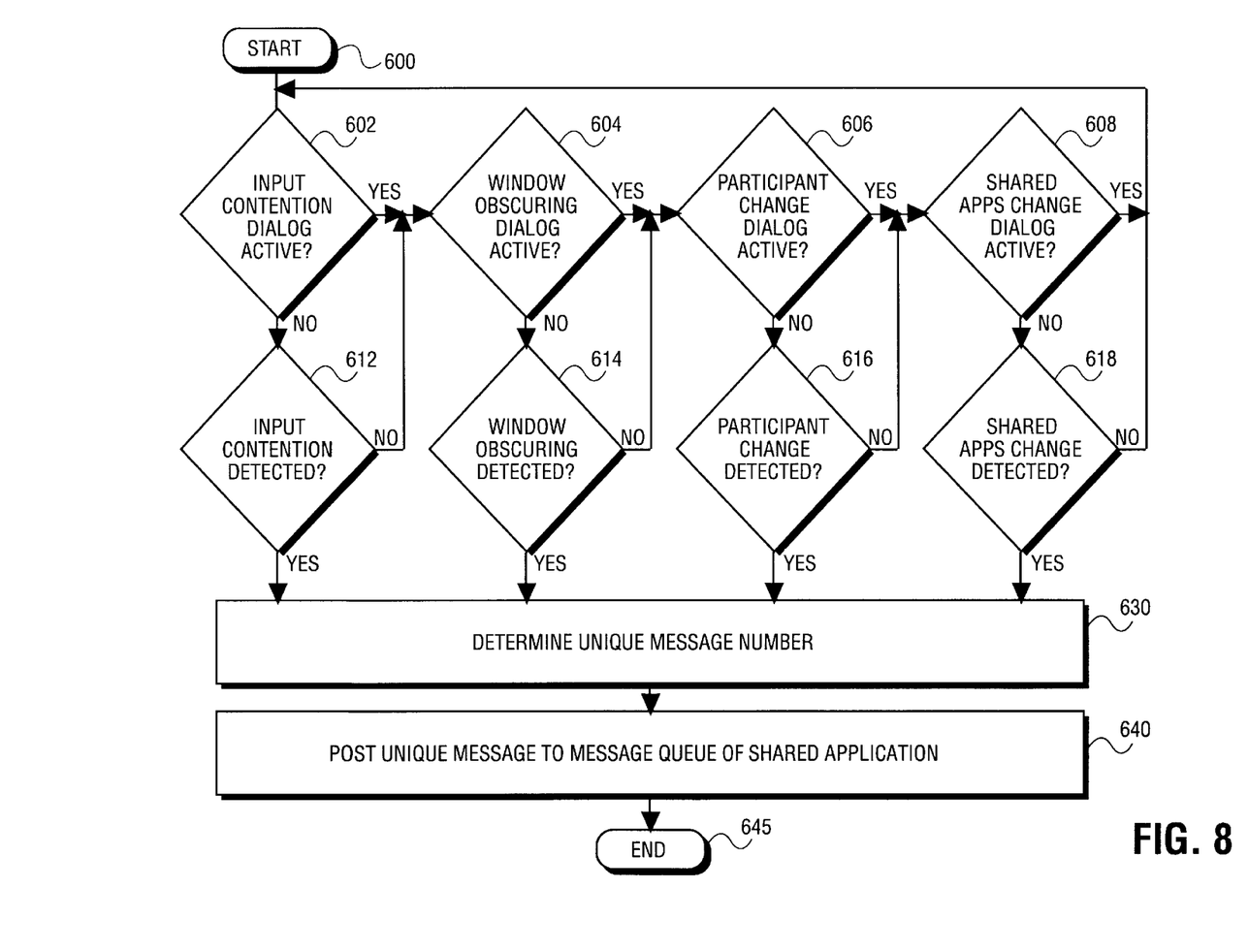
FIG. 8 shows a flowchart of the steps taken by the HASE to post a dialog creation message.

FIG. 8 shows a flowchart of the steps taken by the HASE to post a dialog creation message. The flowchart begins at a block 600, and continues at block 602. At block 602, a determination is made whether an input contention dialog is active. For one embodiment, the input contention dialog is active if such a dialog was previously generated, and has not yet been destroyed. For another embodiment, the input contention dialog is active if a unique message has been posted due to the input contention, but the unique message has not yet been fully processed, i.e., retrieved, acknowledged, and destroyed. The blocks 602–608 are performed to prevent multiple dialogs due to the same problem from being issued.

If an input contention dialog is active, then operation continues at block 604. At block 604, a determination is made whether a window obscuring dialog is active. Similar to block 602, the window obscuring dialog may be active if a window obscuring dialog was previously generated but not yet acknowledged, or if a unique message was posted due to window obscuring, but the unique message has not yet been fully processed.

If a window obscuring dialog is active, then operation continues at block 606. At block 606, a determination is made whether a participant change dialog is active. Similar to the previous blocks 602–604, the window participant change dialog may be active if a window participant change dialog was previously generated but not yet acknowledged, or if a unique message was posted due to a change in participants, but the unique message has not yet been fully processed.

If a participant change dialog is active, the operation continues at block 608. At block 608, a determination is made whether a shared application change dialog is active. Similar to the previous blocks 602–606, the shared application change dialog may be active if a shared application change dialog was previously generated but not yet acknowledged, or if a unique message was posted due to a change in the number of shared application programs, but the unique message has not yet been fully processed.

At block 608, if a shared application change dialog is active, the operation returns to block 602. It should be noted that simultaneous to the flowchart of FIG. 8, dialogs can be acknowledged and processed.

If at block 602, the input contention dialog is not active, then operation continues at block 612, at which a check for input contention is made. If input contention is not detected, then operation continues at block 604. If input contention is detected, then operation continues at block 630.

If at block 604, the window obscuring dialog is not active, then operation continues at block 614, at which a check for window obscuring is made. If window obscuring is not detected, then operation continues at block 606. If window obscuring is detected, then operation continues at block 630.

If at block 606, the participant change dialog is not active, then operation continues at block 616, at which a check for participant change is made. If a change in the number of participants in the computer conference is not detected, then operation continues at block 608. If a participant change is detected, then operation continues at block 630.

If at block 608, the shared application change dialog is not active, then operation continues at block 618, at which a check for shared application change is made. If a change in the number of application programs being shared is not detected, then operation continues at block 602. If a shared application change is detected, then operation continues at block 630.

At block 630, a message number that is unique to the host computer system is determined. From block 630, operation continues at block 640, at which the HASE posts a message having the unique message number to the message queue of one of the shared application programs. From block 640, operation continues at block 645, at which the flowchart terminates. The flowchart of FIG. 8, however, runs over and over again to keep posting unique messages to the message queues as the various events that trigger a notification arise. FIG. 8 is not meant to be a complete listing of events giving rise to notification of the conference participants. Many other triggering events are conceivable.

Figure 9:
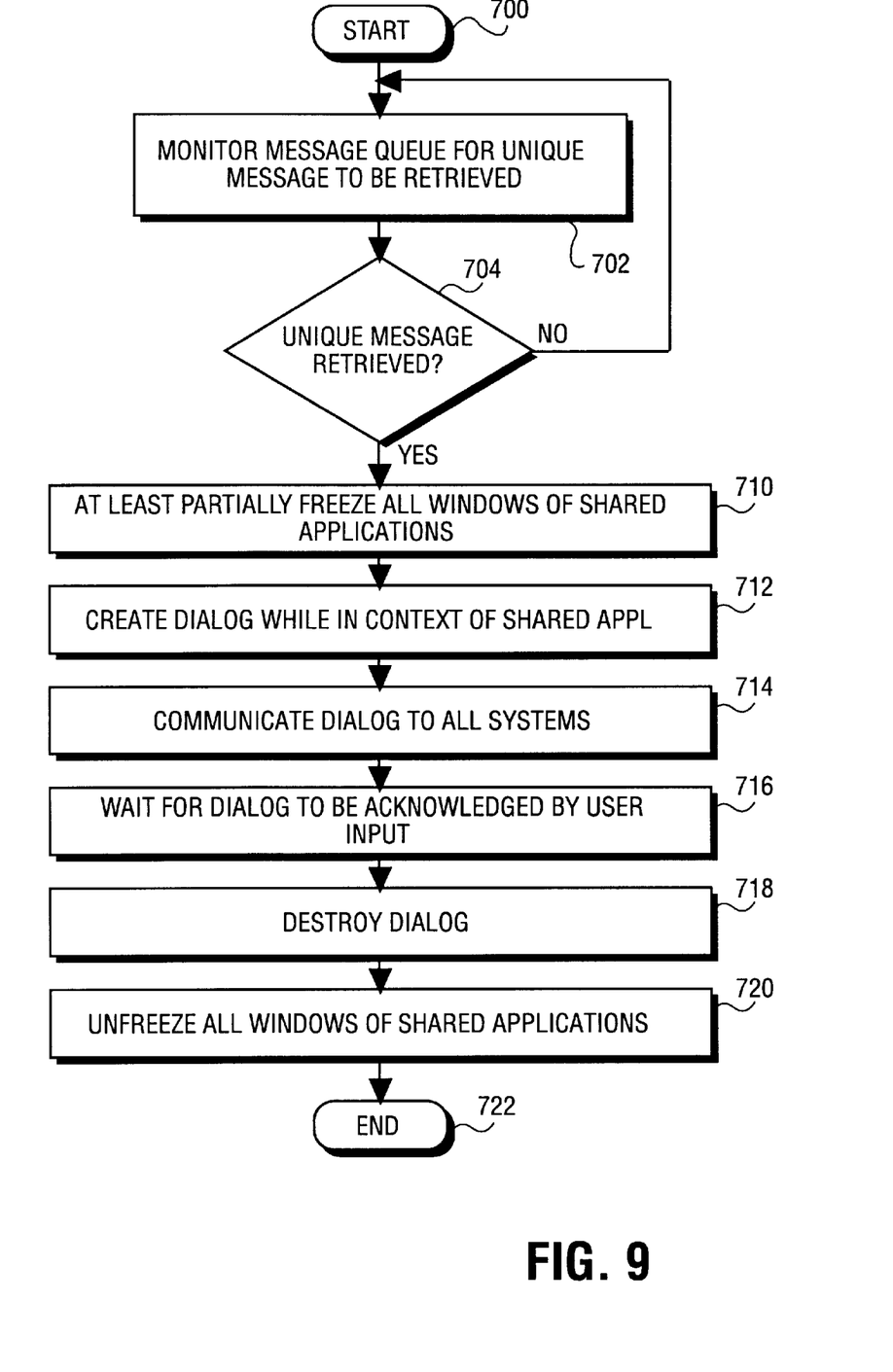
FIG. 9 shows a flowchart of the steps taken by the HASE to create a shared dialog in response to a dialog creation message.

FIG. 9 shows a flowchart of the steps taken by the HASE to create a shared dialog in response to a dialog creation message. The flowchart starts at block 702, at which the HASE monitors retrievals from the message queues of the shared application programs via the hooking mechanism of the operating system.

At block 704, if the unique message indicative of creating a dialog is detected as having been retrieved from one of the message queues, then operation continues at block 710. If the unique message is not detected, however, then operation returns to block 702 to monitor for the unique message.

At block 710 all of the shared windows are at least partially frozen on the host computer system. For one embodiment, the windows can still be updated, but they are prevented from overlaying the new dialog. Operation continues at block 712, at which a dialog is created by the HASE while in the context of the shared application associated with the message queue from which the unique message was retrieved. From block 712, operation continues at block 714, at which the dialog is communicated to all of the computer systems via the communication medium 110.

From block 714, operation continues at block 716 at which the dialog is displayed until it is acknowledged by at least one user input from either the host computer system or one of the guest computer systems.

From block 716, operation continues at block 718, at which the dialog is destroyed, or removed. From block 718, operation continues at block 720, at which all of the windows of the shared applications are unfrozen so that they can once again overlay other windows of the screen display. For one embodiment, the blocks 710 and 720 are optional, such that the windows are allowed to overlay the dialog.

Multiple dialog creation messages can be posted to multiple message queues of the shared applications. The flowchart of FIG. 9 is performed repeatedly to handle any newly posted conference notification messages.

Figure 10:
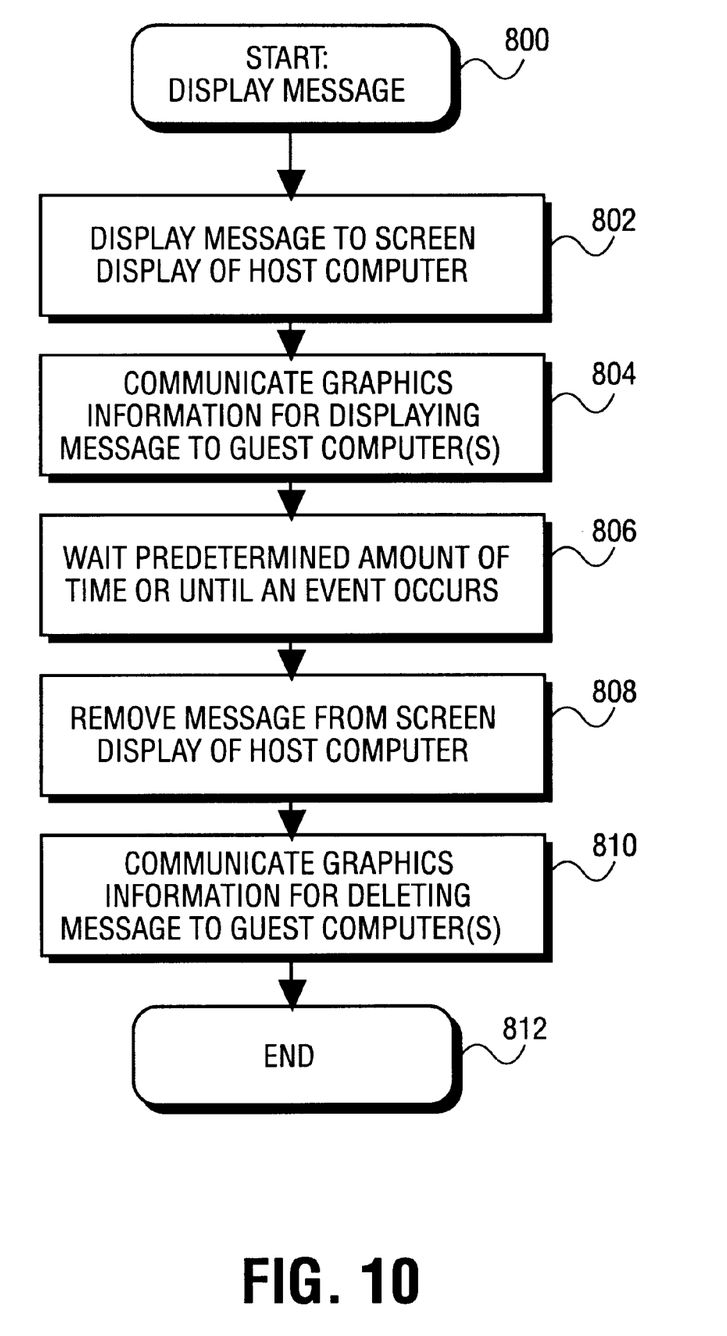
FIG. 10 is a flowchart showing alternate steps taken by the HASE to display a message.

FIG. 10 is a flowchart showing alternate steps taken by the HASE to display a message. The flowchart starts at block 800 and continues at block 802, at which the notification message is displayed to the screen display of the host computer system. This is accomplished by the HASE communicating graphics information to the host's display driver via the host's operating system. Operation continues at block 804, at which graphics information for displaying the notification message is communicated to the guest computers. From block 804, operation continues at block 806.

At block 806, the HASE waits a predetermined amount of time or until an event occurs, such as the problem causing the notification going away. Block 806 is optional. As previously discussed, one embodiment includes scrolling the message across the display screen.

From block 806, operation continues at block 808, at which the notification message is removed from the screen display of the host computer system. From block 808, operation continues at block 810.

At block 810, graphics information for deleting the notification message is communicated to the guest computer systems. From block 810, the flowchart terminates at block 812.

In the foregoing specification, the invention has been described with reference to specific exemplary embodiments thereof. It will, however be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of communicating conference status information from a host computer system to one or more guest computer systems in a computer conference, the method comprising the steps of:

(a) a host application sharing engine (HASE) automatically posting a unique message to a message queue associated with a shared application program;

(b) the HASE monitoring the message queue for a retrieval of the unique message; and (c) upon detecting the retrieval of the unique message from the message queue, the HASE opening a separate shared application window on each of the one or more guest computer systems for communicating the conference status information to the one or more guest computer systems of the computer conference, wherein the conference status information is that a shared window is being obscured by an unshared window.

2. The method of claim 1 wherein the step (c) of the HASE communicating the conference status information to the one or more guest computer systems is performed by the HASE creating a dialog embodying the conference status information, wherein the dialog is communicated to the one or more guest computer systems.

3. The method of claim 2 further comprising the steps of:

freezing one or more windows associated with the shared application program prior to creating the dialog, and unfreezing the one or more windows associated with the shared application program after the dialog is destroyed.

4. The method of claim 1 wherein the step (c) of the HASE communicating the conference status information to the one or more guest computer systems is further comprised by the steps of:

at least partially freezing at least one window associated with the shared application program;

creating a dialog embodying the conference status information to be communicated to the one or more guest computer systems;

communicating the dialog to the one or more guest computer systems;

waiting for the dialog to be acknowledged by user input;

destroying the dialog; and unfreezing the at least one window associated with the shared application.

5. The method of claim 1 wherein the step (c) of the HASE communicating the conference status information to the one or more guest computer systems is performed by the HASE creating a dialog embodying the conference status information, wherein the dialog is communicated to the one or more guest computer systems, and after a predetermined amount of time, the dialog is destroyed.

6. The method of claim 1 wherein the step (c) of the HASE communicating the conference status information to the one or more guest computer systems is performed by the HASE communicating graphics information to a display driver of the host computer system, and the HASE communicating the graphics information to a communications network.

7. The method of claim 1, wherein the conference status information comprises one or more of the following: contention between users, shared window is being obscured by an unshared window, a new participant has joined the conference, a participant has left the conference, a new application is being shared in the conference, or an application is no longer being shared in the conference.

8. A method of communicating conference status information to a plurality of computer systems of a computer conference, the method comprising the steps of:

(a) when a status change is detected, automatically posting a unique message to a message queue of a shared application program;

(b) monitoring the message queue for a retrieval of the unique message; and (c) upon detecting the retrieval of the unique message from the message queue (1) generating a new shared application window for displaying the conference status information communicating that a new application is being shared in the conference, or an application is no longer being shared in the conference; and (2) communicating the graphics data onto a communication medium.

9. The method of claim 8 wherein the steps (a),(b), and (c) are performed by a host application sharing engine that is an application program separate from the shared application program.

10. The method of claim 8 wherein each of the plurality of computer systems includes a display screen, wherein the shared application program displays an associated window on the display screen, and the steps (a)–(c) are performed in response to the associated window becoming obscured by a second window.

11. The method of claim 10 wherein the second window is associated with an application program that has data that is not shared among the plurality of computer systems.

12. The method of claim 8 wherein each of the plurality of computer systems includes a user input, and wherein the steps (a)–(c) are performed in response to contention among the user inputs of the plurality of computer systems.

13. The method of claim 8 wherein the steps (a)–(c) are performed in response to the plurality of computer systems of the computer conference changing in number.

14. The method of claim 8 wherein the steps (a)–(c) are performed in response to data corresponding to a new application program becoming shared among the plurality of computer systems of the computer conference.

15. The method of claim 8, wherein the conference status information comprises one or more of the following: contention between users, shared window is being obscured by an unshared window, a new participant has joined the conference, a participant has left the conference, a new application is being shared in the conference, or an application is no longer being shared in the conference.

16. In a conferencing system comprising two or more computer systems coupled together via a communications network a method comprising the steps of (a) a host application sharing engine (HASE) registering as a hook chain procedure for the shared application program in order to monitor retrievals of messages from a message queue associated with the shared application program;

(b) the HASE generating graphics information within the context of the shared application program in response to a retrieval of a predetermined messagefrom the message queue associated with the shared application program; and (c) the HASE generating a separate shared window to communicate the graphics information via a communications network among the two or more computer systems for display of the conference status information to screen displays of the two or more computer systems, the conference status information including information that a new participant has joined the conference, or that a participant has left the conference.

17. The method of claim 16 wherein the step (c) of the HASE communicating the graphics information via the communications network further comprises the step of:
(c1) preventing one or more windows from obscuring the conference status information until the conference status information has been acknowledged by a user input from one of the two or more computer systems.

18. The method of claim 16 further comprising the steps of:
(d) waiting a predetermined amount of time; and
(e) the HASE generating new graphics information within the context of the shared application program, the new graphics information not including the conference status information; and
(f) the HASE communicating the new graphics information via the communications network among the two or more computer systems for removing the conference status information from the screen displays of the two or more computer systems.

19. The method of claim 16, wherein the conference status information comprises one or more of the following: contention between users, shared window is being obscured by an unshared window, a new participant has joined the conference, a participant has left the conference, a new application is being shared in the conference, or an application is no longer being shared in the conference.

20. An apparatus for communicating conference status information from a first computer system to a second computer system, both computer systems open in a first application, the first computer system running under control of a multitasking operating system, the apparatus comprising:
a notification mechanism for creating a separate shared window including graphics information within the context of one of the one or more shared application programs, the graphics information embodying the conference status information wherein the notification mechanism does not reside within any of the one or more shared application programs;
a hook mechanism for registering the notification mechanism as a hooked procedure with the multitasking operating system, wherein a second application from the one or more shared applications is opened in the first computer system and the second computer system, and conference status information provided in that second application, and wherein the conference status information may be that there is contention between user; and
wherein the conference status information is that a shared window is being obscured by an unshared window.

21. The apparatus of claim 20 further comprising:
a posting mechanism for posting a unique message to a message queue associated with one of the one or more shared application programs in response to a notification triggering event.

22. The apparatus of claim 20 wherein each of the first computer system and the second computer system include a display screen, wherein the shared application program displays an associated window on the display screen, and the notification mechanism creates the shared window including the graphics information in response to the associated window becoming obscured by a second window.

23. The apparatus of claim 22 wherein the second window is associated with an application program that has data that is not shared among the plurality of computer systems.

24. The apparatus of claim 20 wherein the first computer system and the second computer system include a user input, and wherein the notification mechanism creates the shared window including the graphics information in response to contention among the user inputs of the first computer system and the second computer system.

25. The apparatus of claim 20 wherein the notification mechanism creates the shared window including the graphics information in response to a number of computer systems in the computer conference changing in number.

26. The apparatus of claim 20 wherein the notification mechanism creates the shared window including the graphics information in response to data corresponding to a new application program becoming shared among the first and the second computer systems of the computer conference.

27. The apparatus of claim 20, wherein the conference status information comprises one or more of the following: contention between users, shared window is being obscured by an unshared window, a new participant has joined the conference, a participant has left the conference, a new application is being shared in the conference, or an application is no longer being shared in the conference.

* * * * *